United States Patent
Abel et al.

(10) Patent No.: US 8,026,648 B2
(45) Date of Patent: Sep. 27, 2011

(54) ELECTRIC MACHINE

(75) Inventors: Falko Abel, Aufhausen (DE); Michal Kalavsky, Kosice (SK); Pietro de Filippis, Milan (IT)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 839 days.

(21) Appl. No.: 10/581,234

(22) PCT Filed: Dec. 9, 2004

(86) PCT No.: PCT/EP2004/053371
§ 371 (c)(1),
(2), (4) Date: Nov. 17, 2008

(87) PCT Pub. No.: WO2005/060074
PCT Pub. Date: Jun. 30, 2005

(65) Prior Publication Data
US 2009/0066181 A1 Mar. 12, 2009

(30) Foreign Application Priority Data
Dec. 9, 2003 (DE) .................. 103 57 502

(51) Int. Cl.
*H02K 21/12* (2006.01)
(52) U.S. Cl. .......... 310/156.53; 310/156.33; 310/156.56
(58) Field of Classification Search . 310/156.01–156.84
See application file for complete search history.

(56) References Cited

U.S. PATENT DOCUMENTS

| 4,139,790 | A | 2/1979 | Steen |
| 6,234,767 | B1 | 5/2001 | Takeda et al. |
| 7,230,359 | B2 * | 6/2007 | Iles-Klumpner ......... 310/156.53 |
| 2002/0047435 | A1 | 4/2002 | Takahashi et al. |
| 2002/0070619 | A1 | 6/2002 | Nishiyama et al. |
| 2002/0145352 | A1 | 10/2002 | Kimura et al. |

FOREIGN PATENT DOCUMENTS

| EP | 0 909 003 | 4/1999 |
| EP | 1 065 777 | 1/2001 |
| EP | 1 067 656 | 1/2001 |
| EP | 1 164 684 | 12/2001 |
| JP | 9-294344 | 11/1997 |
| JP | 10-4643 | 1/1998 |
| JP | 11-98792 | 4/1999 |

(Continued)

OTHER PUBLICATIONS

International Search Report PCT/EP2004/053371.

*Primary Examiner* — Quyen Leung
*Assistant Examiner* — Leda Pham
(74) *Attorney, Agent, or Firm* — James E. Howard; Andre Pallapies

(57) ABSTRACT

An electric machine, especially a brushless DC motor. Said electric machine comprises a rotor and a stator which is provided with current-carrying coils. Said rotor, in the circumferential direction, is provided with a plurality of permanent magnets that are embedded in respective magnet retainers between the peripheral surface and the shaft of the rotor in such a manner that the permanent magnets, in the radial direction, are completely encircled by the peripheral surface of the rotor. In the area of the magnet retainer, recesses extend laterally in the circumferential direction of the rotor and axially within the rotor.

20 Claims, 1 Drawing Sheet

FOREIGN PATENT DOCUMENTS

Figure 1:
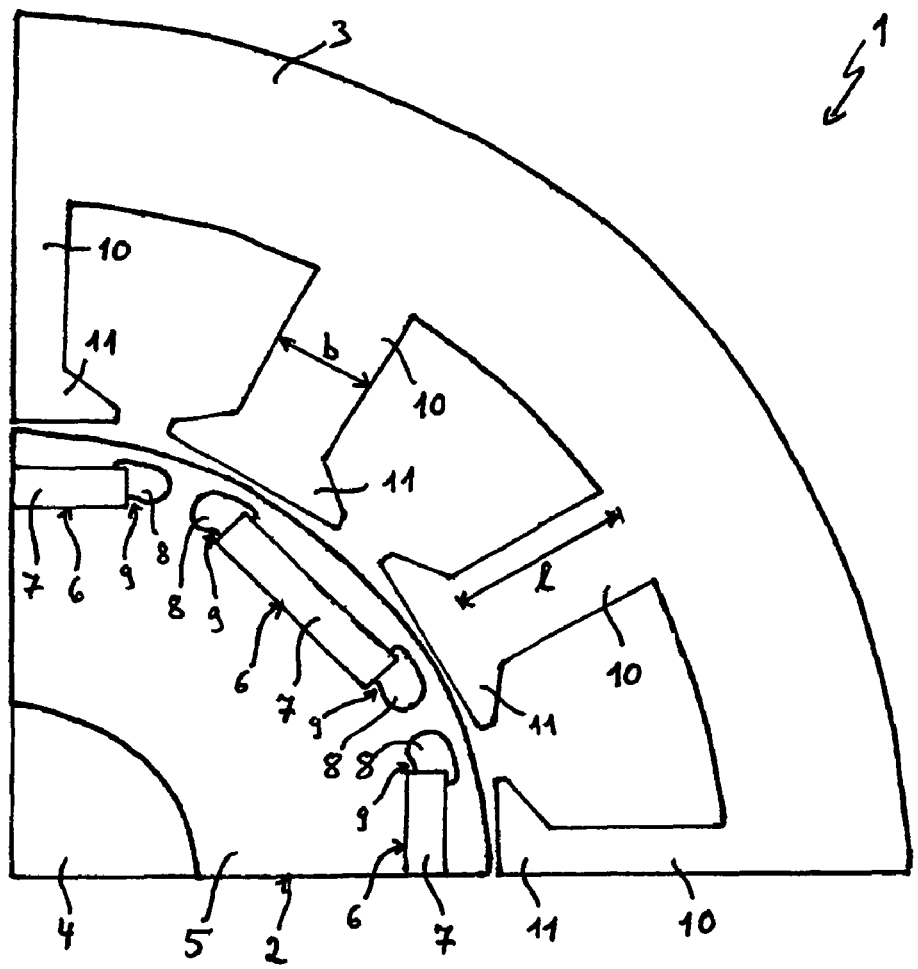

| | | |
|---|---|---|
| JP | 11-220846 | 8/1999 |
| JP | 2000-278895 | 10/2000 |
| JP | 2000-278896 | 10/2000 |
| JP | 2001-258187 | 9/2001 |
| JP | 2002-281700 | 9/2002 |
| JP | 2003-88071 | 3/2003 |
| JP | 2003088071 A * | 3/2003 |

* cited by examiner

ELECTRIC MACHINE

The present invention relates to an electric machine, especially a brushless DC motor, comprising a stator provided with current-carrying coils and at least one partly magnetisable rotor which is provided with a plurality of permanent magnets in the circumferential direction, each embedded in a magnet retainer between the peripheral surface and shaft of the rotor such that in the radial direction, the permanent magnets are completely encircled by the peripheral surface of the rotor.

Such a machine works by applying voltages to the windings in a predefined time pattern such that the currents thereby produced in the windings generate a rotating magnetic field in which the rotor attempts to align itself and thus drive the shaft or whereby the rotor driven from outside by means of the shaft induces oscillating currents in the windings of the stator by the magnetic field of the rotating permanent magnets.

In order that the permanent magnets do not detach from the rotor at high speeds, these are embedded in the rotor and completely encircled by the rotor iron in the radial direction. In this way, a closed magnetic circuit is produced between the poles of the permanent magnet via the rotor iron whereby the magnetic flux between the rotor and stator is reduced and thus the efficiency of the electric machine is reduced.

It is the object of the present invention to provide a cost-effective machine with a high efficiency which is designed for a high speed range.

The object is achieved by an electric machine having the features of claim 1.

The electric machine, especially the brushless DC motor, comprises a rotor and a stator provided with current-carrying coils. The rotor is provided with a plurality of permanent magnets in the circumferential direction, each embedded in a magnet retainer between the peripheral surface and shaft of the rotor such that in the radial direction, the permanent magnets are completely encircled by the peripheral surface of the rotor. At the magnet retainer, material recesses extend axially inside the rotor in the circumferential direction of the rotor at the side of the permanent magnets. In this way, the magnetic flux in the rotor iron is guided around the material recesses. This has the advantage that the magnetic flux between the rotor and stator is increased, whereby a high efficiency can be achieved during operation of the electric machine.

In particular, the material recesses extend on both sides of the magnet retainer. In this way, a symmetrical distribution of the magnetic flux can be achieved during rotation of the rotor both when a permanent magnet approaches a stator tooth and when the permanent magnet moves away from the stator tooth. Furthermore, the differences in the magnetic flux density between the rotor and stator which occur over the circumference of the rotor are thereby reduced. This results in a torque having low ripple, a low click point, and therefore low noise emission even at high rotor speeds.

According to a preferred embodiment, the material recesses run adjacent to the peripheral surface of the rotor. This has the advantage that the remaining wall thickness is rapidly saturated by the magnetic flux, especially if the wall thickness is minimised in such a manner that it can still withstand the centrifugal forces of the permanent magnet at the highest possible rotor speed.

Advantageously, the permanent magnet embedded in the magnet retainer protrudes into the material recesses of the rotor, especially at least with its axial edges adjacent to the peripheral surface of the rotor. In this way, the magnetic flux in the rotor iron between the permanent magnet and the peripheral surface of the rotor, the so-called pole shoe, is increased since the permanent magnet is wider than the pole shoe in the circumferential direction and thus a substantial portion of the magnetic field lines emanating from the portion of the permanent magnet extending into the material recess cover their path through the permanent magnet as far as the pole shoe before they leave the permanent and enter into the rotor iron.

The material recesses preferably open perpendicularly on an outer surface of the permanent magnet adjacent to the peripheral surface of the rotor. In this way, the magnetic flux adjacent to the material recess can leave and enter the pole shoe perpendicular to the outer surface of the permanent magnet, thereby maximising the flux density in the pole shoe since the magnetic flux in the pole shoe neck is initially focussed and only then distributed in the pole shoe head.

The material recesses advantageously have a rounded transition from a profile parallel to the peripheral surface of the rotor to a profile perpendicular to the outer surface of the permanent magnet. In this way, the magnetic flux in the remaining wall thickness can be guided between the material recess and the peripheral surface of the motor such that the magnetic flux between rotor and stator is maximum and the click point is minimal.

According to a preferred embodiment, the permanent magnet abuts against a pole shoe of the rotor in the circumferential direction with a partial width of its outer surface, where in particular, the partial width corresponds at least approximately to a tooth-shoe width of a stator tooth in the circumferential direction. This has the advantage that the maximum magnetic flux can occur between rotor and stator when the permanent magnet is exactly opposite to the stator tooth so that a high efficiency can be achieved.

Lugs extending axially through the material recesses are preferably formed on the magnet retainer for holding the permanent magnet. In this way, the permanent magnets can be held in the magnet retainer in a particularly simple manner.

By dispensing with the curvature of the magnets, it is possible to produce these substantially more cheaply than conventional magnets with circular-segment-shaped external surfaces. Ideally, the magnets of the machine according to the invention are rectangular and are arranged with their narrow sides in the circumferential direction.

According to a preferred embodiment, the stator has a plurality of stator teeth whose end surfaces of their tooth shoe adjacent to the rotor are constructed as flat and tangential to the circumferential surface of the rotor. This has the advantage that during operation of the electric machine a torque having a particularly low ripple can be produced. As a result of the particularly low click point of the electric machine associated therewith, this results in low noise emission even at high rotor speeds and improved efficiency.

Each stator tooth preferably carries turns of a single coil. In this way, the electric machine is particularly efficient and cost-effective with regard to use of material and only low leakage losses occur.

In order to obtain a machine with good synchronous operation and low noise emission, preferably twelve stator teeth and therefore twelve individual stator coils are located opposite to the eight permanent magnets of the rotor. These are each connected periodically alternately to three different phases. Other numbers of permanent magnets and stator teeth are also possible, preferably in the ratio of number of permanent magnets to number of stator teeth of two to three, of four to three, of five to six or of seven to six.

In particular, the permanent magnets are magnetised parallel to their side surfaces facing the material recesses, whereby they are particularly cost-effective.

Permanent magnets of high coercive field strength or residual magnetisation are preferred; the permanent magnets preferably contain ferrite and/or NdFeB and/or rare earths. In particular, NdFeB permanent magnets have a high residual magnetisation and have a good cost/material ratio.

The permanent magnets are preferably the same length in the axial direction or longer than the rotor to compensate for stray face ring effects.

A preferred area of application of the electric machine according to the invention are drives for washing devices, especially in the form of permanent-magnet hybrid motors. Speeds of the order of magnitude of up to about 20,000 revolutions per minute typically occur in these drives.

The material recesses can be filled with non-magnetic materials to balance the rotor.

Figure 2:
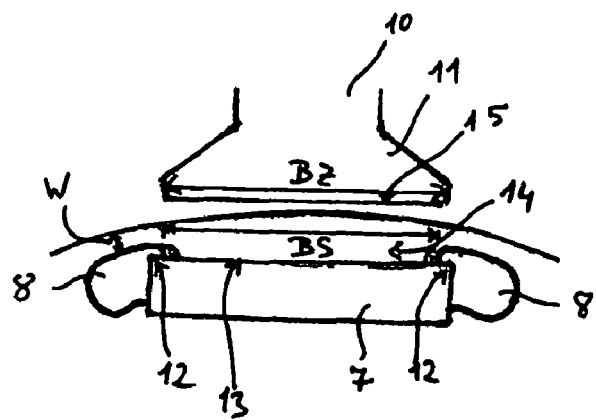

Further features and advantages of the invention are obtained from the following description of an exemplary embodiment with reference to the appended drawings. In the figures:

FIG. 1 is a quadrant of a radial section through the rotor and stator of an exemplary embodiment of the electric machine according to the invention and FIG. 2 is an enlarged section from a tooth shoe according to FIG. 1.

According to the drawing, the electric machine 1 is constructed with a rotor 2 and a stator 3, the rotor 2 being mounted on a shaft 4 for transmitting a torque. In the axial direction, the rotor 2 is composed of a core 5 of identically shaped individual sheets which are configured according to the radial cross section shown in FIG. 1. The core 5 has a total of eight magnet retainers 6, each equipped with one permanent magnet 7. On both sides of each of the magnet retainers 6, respectively one material recess 8 extends axially through the entire core 5 laterally in the circumferential direction of the rotor 2. The permanent magnets 7 are configured as rectangular and are arranged with their narrow sides in the circumferential direction. Lugs 9 for retaining the permanent magnets 7 are constructed at the material recesses 8.

The stator 3 has an outer frame from which twelve stator teeth 10 extend radially inwards, these teeth being broadened at their ends to form stator shoes 11. Each of the stator teeth 10 carries wire windings of a single coil (not shown). These are each connected periodically alternately to three different phases of a three-phase supply voltage delivered by an electronic AC/DC inverter. The width b of the stator teeth 10 in the circumferential direction is at least a quarter of their axial length l, that is the cross-section of the stator teeth 10 is comparatively compact. A favourable ratio of wound wire length or mass to cross-sectional area of the stator teeth 10 is thereby obtained and in addition, the windings can be produced rapidly since only one comparatively small axial stroke is required of a guide tool which runs around the winding core during winding and delivers the winding wire.

FIG. 2 shows an enlarged section from FIG. 1 wherein one of the permanent magnets 7 is directly opposite one of the stator teeth 10. The material recesses 8 on both sides of the magnet retainer 6 of the permanent magnet 7 run parallel adjacent to the circumferential surface of the rotor 3 with a wall thickness W. The permanent magnet 7 projects with its axial edges 12 facing the stator 3 into the material recesses 8 on both sides. The material recesses 8 open perpendicularly on an outer surface 13 of the permanent magnet 7 adjacent to the circumferential surface of the rotor 2. The permanent magnet 7 abuts against a pole shoe 14 of the rotor 2 with this outer surface 13. The stator tooth is constructed with a flat end surface 15 of the tooth shoe 11 facing the rotor 2. This end surface 15 has a width BZ in the circumferential direction which at least approximately corresponds to a width BS of the pole shoe 14.

The rotor 2 which is formed by the core 5 has an axial length slightly smaller than that of the permanent magnets 7. The rectangular permanent magnets 7 are parallel magnetised and consist of NdFeB. Typical dimensions of the permanent magnets 7 for application in a washing machine with a rotor diameter of the order of magnitude of 60 mm are a height of about 2.5 mm, an axial length of about 2 to 3 mm more than the axial length of the core 5 and an edge width in the circumferential direction in the range of 12 to 16 mm, especially of about 14 mm. The permanent magnets 7 project with about 5 percent of their edge width into one of the material recesses 8 on both sides. In order to be able to withstand the centrifugal forces of permanent magnets at typical rotor speeds of about 20,000 revolutions per minute, the minimal wall thickness W between the magnet retainers 6 or the recesses 8 and the circumferential surface of the rotor 2 is about 1.0 mm.

The invention claimed is:

1. An electric machine including a brushless DC motor comprising a stator provided with current-carrying coils and at least one partly magnetizable rotor which is provided with a plurality of permanent magnets in the circumferential direction, each embedded in a magnet retainer between the peripheral surface and shaft of the rotor such that in the radial direction, the permanent magnets are completely encircled by the peripheral surface of the rotor, wherein the permanent magnets are rectangular and are arranged with their narrow sides in the circumferential direction, and wherein the stator has a plurality of stator teeth whose end surfaces of their tooth shoe adjacent to the rotor are constructed as flat and tangential to the circumferential surface of the rotor, wherein at the magnet retainer, material recesses of the rotor extend axially inside the rotor laterally in the circumferential direction of the rotor in such a manner that the permanent magnet protrudes into the material recesses at least with its axial edges adjacent to the peripheral surface of the rotor so that the permanent magnet is wider in the circumferential direction than its appurtenant pole shoe neck of the rotor and abuts against the pole shoe of the rotor with a partial width of its external surface and that the partial width corresponds to a tooth shoe width of a stator tooth in the circumferential direction.

2. An electric machine including a brushless DC motor comprising:
   a stator provided with
      current-carrying coils, and
      a plurality of stator teeth, each having a tooth shoe with an end surface; and
   at least one partly magnetizable rotor which is provided with a plurality of permanent magnets in a circumferential direction, each of the magnets being embedded in a magnet retainer between a peripheral surface of the rotor and a shaft of the rotor such that in a radial direction, the permanent magnets are completely encircled by the peripheral surface of the rotor,
   wherein the permanent magnets are rectangular and are arranged with their narrow sides in the circumferential direction,
   end surfaces of the tooth shoes are adjacent to the rotor and are constructed as flat and tangential to the peripheral surface of the rotor,
   at the magnet retainer, material recesses in the rotor extend axially inside the rotor and laterally in the circumferential direction of the rotor in such a manner that the permanent magnet protrudes into the material recesses at least with its axial edges adjacent to the peripheral surface of the rotor so that the permanent magnet is wider in the circumferential direction than an appurtenant pole shoe neck of the rotor and abuts against a pole shoe of the rotor with a partial width of its outer surface, and the partial width of the external surface of the permanent magnet is approximately equal to a tooth shoe width of one of the stator teeth in the circumferential direction.

3. The machine according to claim 2, wherein the material recesses run parallel adjacent to the peripheral surface of the rotor with a wall thickness which is minimized such that the wall thickness can withstand centrifugal forces of the permanent magnet at the highest possible speed of the rotor.

4. The machine according to claim 2, wherein the material recesses open perpendicularly on the outer surface of the permanent magnet adjacent to the peripheral surface of the rotor with which the permanent magnet abuts against the pole shoe of the rotor.

5. The machine according to claim 4, wherein the material recesses have a rounded transition from a profile parallel to the peripheral surface of the rotor to a profile perpendicular to the outer surface of the permanent magnet.

6. The machine according to claim 2, wherein lugs extended axially through the material recesses are formed on the magnet retainer for holding the permanent magnet.

7. The machine according to claim 2, wherein each stator tooth carries turns of a single coil.

8. The machine according to claim 2, wherein the electric machine is constructed with eight permanent magnets and twelve stator teeth.

9. The machine according to claim 2, wherein the permanent magnets are magnetized parallel to their side surfaces facing the material recesses.

10. The machine according to claim 2, wherein the permanent magnets contain at least one of ferrite, NdFeB and rare earths.

11. The machine according to claim 2, wherein the permanent magnets are at least as long in the axial direction as the rotor.

12. An electric machine including a brushless DC motor comprising:
   a stator having
      a plurality of current-carrying coils, and
      a plurality of stator teeth, each having a tooth shoe with an end surface;
   a rotor having a peripheral surface, the rotor having
      a shaft about which the rotor rotates, the shaft extending in an axial direction,
      a plurality of magnet retention areas arranged circumferentially in the rotor and positioned between the peripheral surface of the rotor and the shaft such that, in a radial direction, the magnet retention areas are completely encircled by the peripheral surface of the rotor,
      two material recesses located circumferentially adjacent to each magnet retention area, a first one of the two material recesses being located on a first circumferential side of the magnet retention area and a second one of the two material recesses being located on a second circumferential side of the magnet retention area that is opposite to the first circumferential side; and
   a plurality of permanent magnets, each of the magnets
      is embedded in one of the magnet retention areas,
      is rectangular in a cross section perpendicular to the shaft,
      has a radially outward face, a radially inward face, and two end faces, and
      has an axial edge where the radially outward face intersects each of the end faces, the axial edges extending in the axial direction,
   wherein the end surfaces of the tooth shoes are adjacent to the rotor, are flat, and are tangential to the peripheral surface of the rotor, and
   each material recess extends axially inside the rotor and laterally in a circumferential direction of the rotor such that the axial edges of the magnet protrude into the material recesses.

13. The machine according to claim 12, wherein the rotor further comprises a plurality of pole shoe necks, each of the pole show necks
   is adjacent to a corresponding one of the magnets, and
   has a pole shoe that abuts the radially outward face of the corresponding magnet and is narrower in the circumferential direction than the radially outward face of the corresponding magnet.

14. The machine according to claim 13, wherein a width of the pole shoe in the circumferential direction is approximately equal to the width of one of the tooth shoes in the circumferential direction.

15. The machine according to claim 13, wherein the material recesses have a rounded transition from a profile parallel to the peripheral surface of the rotor to a profile perpendicular to the outer surface of the magnet.

16. The machine according to claim 13, wherein lugs extending axially through the material recesses are formed on the rotor adjacent to the magnet retention areas to hold the magnet.

17. The machine according to claim 13, wherein each stator tooth carries turns of a single coil.

18. The machine according to claim 13, wherein the electric machine has eight of the permanent magnets and twelve of the stator teeth.

19. The machine according to claim 13, wherein the permanent magnets are magnetized parallel to their end faces.

20. The machine according to claim 13, wherein the permanent magnets are at least as long in the axial direction as the rotor.

* * * * *